United States Patent [19]

Kalian et al.

[11] Patent Number: 5,456,517
[45] Date of Patent: Oct. 10, 1995

[54] CAST SHOCK TOWER FOR A VEHICLE

[75] Inventors: Arianna Kalian, Farmington Hills; David A. Dolenga, Sterling Heights; Adelbert O. Czapp, Rochester Hills, all of Mich.

[73] Assignee: General Motors Corporation, Detroit, Mich.

[21] Appl. No.: 172,203

[22] Filed: Dec. 23, 1993

[51] Int. Cl.$^6$ .................................................. B62D 25/08
[52] U.S. Cl. ........................ 296/194; 280/788; 280/688; 164/47
[58] Field of Search .......................... 280/788, 688; 296/192, 193, 194; 164/47

[56] References Cited

U.S. PATENT DOCUMENTS

| | | | |
|---|---|---|---|
| 3,768,828 | 10/1973 | Klein | 280/124 |
| 3,797,852 | 3/1974 | Patterson et al. | 280/124 |
| 3,994,469 | 11/1976 | Swenson et al. | 248/400 |
| 4,083,545 | 4/1978 | Herbenar | 267/54 |
| 4,408,794 | 10/1983 | Harasaki | 296/198 |
| 4,723,811 | 2/1988 | Harasaki | 296/194 |
| 4,767,134 | 8/1988 | Booher | 280/719 |
| 4,789,198 | 12/1988 | Ide | 296/192 |
| 4,789,199 | 12/1988 | Komatsu | 296/194 |
| 4,919,474 | 4/1990 | Adachi et al. | 296/194 |
| 4,955,663 | 9/1990 | Imura | 296/194 |
| 5,024,482 | 6/1991 | Harasaki et al. | 296/194 |
| 5,031,958 | 7/1991 | Fujita et al. | 296/194 |
| 5,052,742 | 10/1991 | Akoshima et al. | 296/192 |
| 5,087,074 | 2/1992 | Komatsu et al. | 280/788 |
| 5,127,666 | 7/1992 | Fujinaka | 280/688 |
| 5,145,204 | 9/1992 | Perkins | 280/668 |
| 5,169,171 | 12/1992 | Ban et al. | 280/688 |

FOREIGN PATENT DOCUMENTS

| | | | |
|---|---|---|---|
| 0196360 | 10/1986 | Germany | 296/194 |
| 404055173 | 2/1992 | Japan | 296/194 |
| 404189683 | 7/1992 | Japan | 296/194 |

*Primary Examiner*—David M. Mitchell
*Assistant Examiner*—Kia M. Robinson
*Attorney, Agent, or Firm*—Anthony L. Simon

[57] ABSTRACT

A shock tower includes first and second portions for attaching a suspension damper and a control arm to a vehicular body. The first portion includes a cap with a central opening. A plurality of ribs are formed on the cap and radially spaced about the central opening. The second portion projects downwardly from the first portion. A plurality of longitudinal ribs are formed on the second portion. Preferably, the first and second portions are formed as a single casting.

9 Claims, 1 Drawing Sheet

CAST SHOCK TOWER FOR A VEHICLE

BACKGROUND OF THE INVENTION

1. Field of the Invention

The present invention relates generally to a vehicular body, and in particular is relates to a shock tower provided in a front portion of a vehicle to mount an upper end of a strut or shock absorber.

2. Description of the Related Art

Shock towers are well-known vehicular body parts. Generally, a shock tower is secured to body components framing an engine compartment and provides an attachment point for an upper end of a suspension damper, such as a strut or shock absorber. Shock towers are commonly formed using sheet metal fabrication techniques. Furthermore, brackets formed from sheet metal are often associated with shock towers and provide an attachment point for a suspension control arm.

SUMMARY OF THE INVENTION

The present invention includes a shock tower formed as a casting. The shock tower includes both a reinforced area for mounting the upper end of a suspension damper and an attachment point for a suspension control arm. By using the present cast shock tower, several parts which were previously formed as stamped metal members can be eliminated and replaced by a single cast member.

In a preferred embodiment, a shock tower includes first and second portions for attaching a suspension damper and a control arm to a vehicular body. The first portion includes a cap with a central opening. A plurality of ribs are formed on the cap and radially spaced about the central opening. The second portion projects downwardly from the first portion. A plurality of longitudinal ribs are formed on the second portion. Preferably, the first and second portions are formed as a single casting.

DETAILED DESCRIPTION OF THE PREFERRED EMBODIMENT

Figure 1:
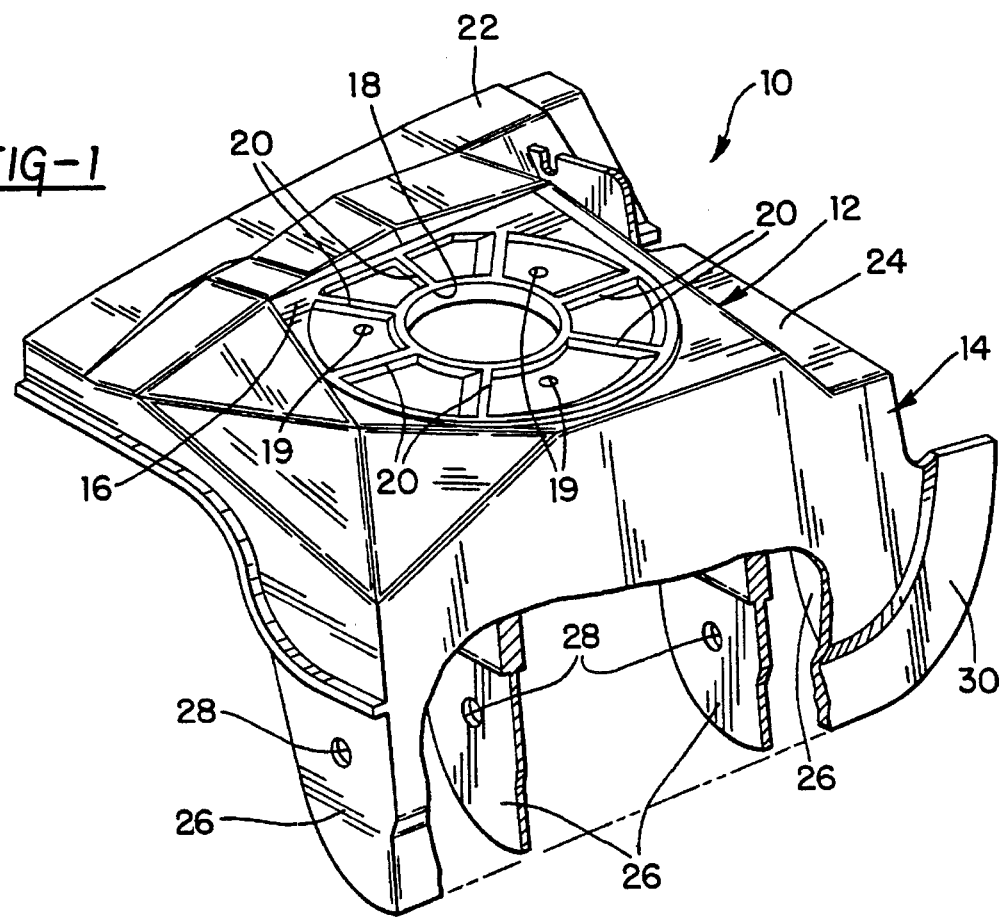
FIG. 1 is a perspective view of a preferred embodiment of a shock tower according to the present invention illustrating a first, generally horizontal portion integrally cast with a second, generally vertical portion.

A preferred embodiment of a shock tower according to the present invention is indicated generally at 10 in FIG. 1. The shock tower 10 includes a first, generally horizontal portion 12 and a second, generally vertical portion 14. Although various techniques of manufacture can be utilized, it is preferred that the shock tower 10 be formed as a single, integrally cast member. Preferably, the casting is formed from material having high yield and ultimate strengths, and high elongation.

The first portion 12 includes a cap 16 having a central opening 18 for receiving an upper end of a damper, such as a coil-over-shock unit (not illustrated). The cap 16 has sufficient surface area along its inner surface for attachment of the damper and any associated mount assembly (not illustrated). Small holes 19 are selectively provided in the cap 16 for fasteners (not illustrated) of a mount assembly. A pattern of ribs 20 are formed in the outer surface of the cap 16 to increase strength and stiffness for reacting loads from the damper. Preferably, the ribs 20 are radially-spaced about the opening 18 in spoke-like fashion. A first flange 22 is formed at one edge of the first portion 12, while a second flange 24, generally perpendicular to flange 22, is formed at another edge. Flanges 22 and 24 provide mounting surfaces for the shock tower 10 as described below.

The second portion 14 includes a plurality of substantially vertical ribs 26 along its inner surface. Preferably, each rib 26 includes a small hole 28 aligned with a hole 28 in an adjacent rib 26. The ribs 26 serve as attachment points for a control arm (not illustrated) and its associated fasteners (not illustrated) and increase the strength of the shock tower 10. The number and configuration of ribs 26 can be altered as necessary for a particular application. A mounting flange 30 is formed along the lower boundary of the second portion 14 to permit an attachment area to a lower rail as described below.

Figure 2:
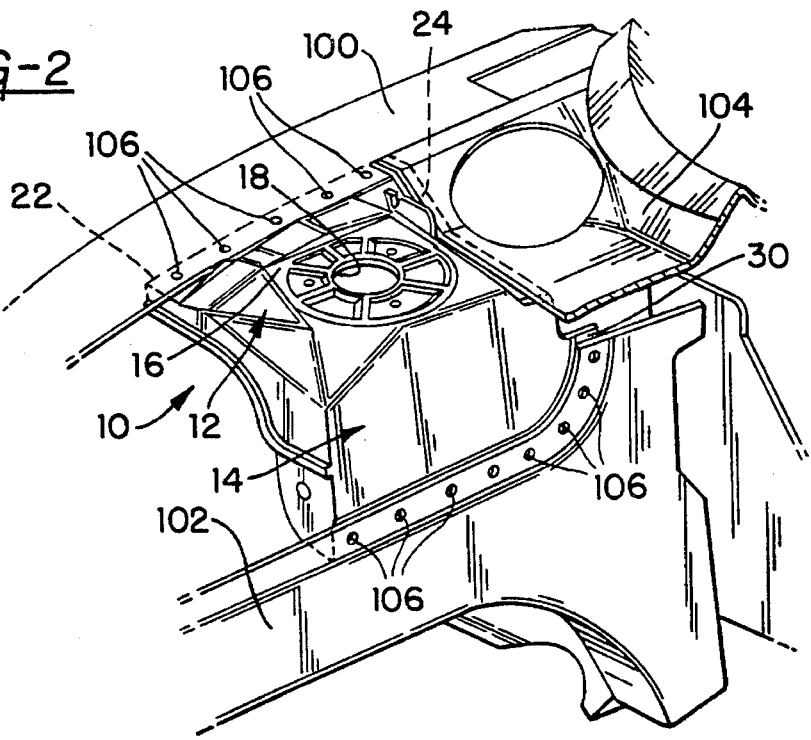
FIG. 2 is a perspective view of a portion of vehicular body members framing an engine compartment, illustrating the shock tower of FIG. 1 mounted between upper and lower rails.

Body components framing a vehicular engine compartment are partially illustrated in FIG. 2. An upper rail 100 substantially aligned with a longitudinal axis of a vehicle is spaced from a lower rail 102. The shock tower 10 is secured between the upper and lower rails 100, 102 in any desirable manner, including fasteners such as rivets 106. If desired, a bonding material such as an epoxy adhesive can be applied to enhance the attachment of the shock tower 10 to the rails 100, 102. Flange 22 is secured to the upper rail 100, while flange 30 is secured to the lower rail 102. Flange 24 is secured to a cowl 104 spanning the distance between upper rail 100 and a complementary upper rail (not illustrated) on the other side of the engine compartment. When attached to the rails 100, 102 and cowl 104, the shock tower 10 provides attachment points for both the upper end of a damper and one end of a suspension control arm. A second shock tower 10 is attached between complementary rails on the opposite side of the engine compartment.

In the embodiment of the FIGS. 1 and 2, the first portion 12 is described as generally horizontal. In other embodiments, the first portion 12 can be formed at any desired orientation to accommodate a suspension configuration. Preferably, the first portion 12 is oriented so as to be generally perpendicular to a longitudinal axis of a suspension damper.

Although the present invention has been described with reference to a preferred embodiment, a person skilled in the art will recognize that changes may be made in form and detail without departing from the spirit and scope of the invention.

The embodiments of the invention in which an exclusive property or privilege is claimed are defined as follows:

1. A shock tower for a vehicle body comprising:
   (a) a first horizontal portion having a cap with a central opening;
   (b) a plurality of ribs formed on the cap and radially spaced about the central opening;
   (c) a second vertical portion projecting downwardly from the first portion; and
   (d) a plurality of vertical ribs formed on the second portion.

2. The shock tower specified in claim 1 wherein the first and second portions are formed as a single member.

3. The shock tower specified in claim 2 wherein the first and second portions are formed as a casting.

4. The shock tower specified in claim 3 wherein the casting is formed from aluminum.

5. The shock tower specified in claim 1 including mounting surfaces formed along selected edges of the first and second portions.

6. The shock tower specified in claim 5 wherein the mounting surfaces are formed as flanges.

7. A method of casting a shock tower for a vehicular body, comprising the steps of simultaneously:
 (a) forming a first portion having a cap with a central opening and a first plurality of ribs radially spaced about the central opening on the cap; and
 (b) integrally forming a second portion with the first portion, the second portion projecting downwardly from the first portion and including a second plurality of ribs.

8. The method specified in claim 7 wherein the shock tower is cast from aluminum.

9. A method of casting a shock tower for a vehicular body, comprising the steps of simultaneously:
 (a) forming a first portion having a cap with a central opening and a plurality of ribs radially spaced about the central opening on the cap; and
 (b) integrally forming a second portion with the first portion, the second portion projecting downwardly from the first portion and including a plurality of substantially vertical ribs.

* * * * *